United States Patent [19]

Holzhausen et al.

[11] Patent Number: 5,083,817
[45] Date of Patent: Jan. 28, 1992

[54] APPARATUS FOR THE DECOUPLING OF TWO PIPE PARTS WITH WIRE MESH CUSHIONS

[75] Inventors: Wieland Holzhausen, Auerbach; Thomas Kunzmann, Walzbachtal; Marc Pontzen, Lambsheim, all of Fed. Rep. of Germany

[73] Assignee: IWK Regler und Kompensatoren GmbH, Fed. Rep. of Germany

[21] Appl. No.: 477,471

[22] Filed: Feb. 9, 1990

[30] Foreign Application Priority Data

Apr. 6, 1989 [DE] Fed. Rep. of Germany ....... 3911114

[51] Int. Cl.$^5$ ............................................. F16L 55/02
[52] U.S. Cl. ...................................... 285/49; 285/226; 285/299; 403/50
[58] Field of Search ............ 277/97, DIG. 9; 285/49, 285/226, 227, 228, 299, 301, 923; 403/50, 51; 464/180, 183, 170, 177

[56] References Cited

U.S. PATENT DOCUMENTS

| | | | |
|---|---|---|---|
| 623,482 | 4/1899 | Lewis | 277/97 |
| 3,430,995 | 3/1969 | Herbenar et al. | 403/51 |
| 4,508,018 | 4/1985 | Choinski et al. | 403/51 X |
| 4,659,117 | 4/1987 | Holzhausen et al. | 285/226 X |
| 4,911,482 | 3/1990 | Doat | 285/226 |

FOREIGN PATENT DOCUMENTS

| | | |
|---|---|---|
| 208128 | 1/1987 | European Pat. Off. |
| 3321382 | 2/1984 | Fed. Rep. of Germany |
| 3622481 | 1/1988 | Fed. Rep. of Germany |

Primary Examiner—Peter M. Cuomo
Assistant Examiner—Timothy Aberle
Attorney, Agent, or Firm—Antonelli, Terry Stout & Kraus

[57] ABSTRACT

For the vibration-based decoupling of two pipe parts, such as the exhaust pipe of an internal combustion engine and the exhaust system, at least two compressed absorber cushions of braided, knitted, tangled or similar wire are arranged so as to absorb or damp movements of substantially the same order of magnitude in all degrees of freedom, that is, with respect to all possible movements. For this purpose, the at least two absorber cushions each have a polygonal configuration.

18 Claims, 7 Drawing Sheets

APPARATUS FOR THE DECOUPLING OF TWO PIPE PARTS WITH WIRE MESH CUSHIONS

SUMMARY OF THE INVENTION

The present invention relates to an apparatus for a vibration-based decoupling of two pipe parts and, more particularly, to a gas-type metal bellows decoupling between an exhaust pipe of an internal combustion engine and the exhaust system, with at least one compressed absorber cushion or pad made from braided, knitted, tangled or similar wire.

BACKGROUND OF THE INVENTION

An apparatus of the aforementioned type is proposed in, for example, DE-OS 3321382, DE-OS 3622481 and EP-OS 208128. While these proposed apparatus have good damping or absorbing behavior in preferred directions, the damping behavior in other directions is inferior and, in part, significantly inferior. For example, the absorber cushions in EP-OS 208128 cannot damp torsional movements and, such torsional movements pass completely through the bellows. While this problem is solved in part, by DE-OS 3622481 since there is a decoupling of torsional movements therein, no damping takes place in this construction.

SUMMARY OF THE INVENTION

The aim underlying the invention essentially resides in further developing an apparatus of the aforementioned type such that an optimum damping or absorption is achieved in all movement directions occurring with such an apparatus.

According to the invention this problem is solved in the case of an apparatus for the vibration-based decoupling of two pipe parts, particularly between an exhaust pipe of an internal combustion engine and the exhaust system, with at least one compressed absorber cushion made from braided, knitted, tangled or similar wire, in that said cushion has a polygonal construction.

The term "polygonal" in connection with such a three-dimensional absorber cushion implies that there are corners, in which at least three sharp edges in each case converge. This polygonal nature restricts the subject matter of the application against cylindrical, cylinder envelope-shaped, frustum-shaped and frustum envelope-shaped absorber cushions which, although having edges as a transition from their circumferential surfaces to their base surfaces, do not have angles in the aforementioned sense. In particular their circumferential surfaces have a smooth construction and no edges, which exist in the case of the application as a result of the polygonal construction of the cushions, Thus, apart from their edges between the circumferential surfaces and the base surfaces, the inventive absorber cushions also have edges between individual circumferential surface areas. Whereas the aforementioned, known damper cushions with a circular base surface cannot absorb circumferential forces acting tangentially on their envelope, in the case of the inventive construction this is made possible by the formation of edges in the envelope, so that the casing parts in the circumferential area can no longer freely twist, as is the case in the prior art and are instead prevented from doing so by the edges in the envelope. The inventively constructed absorber cushions generally have a multiple number, but not an infinite number axis of symmetry at right angles to their base surfaces. As in the case of a plurality of edges in the envelope or corners of the base surface of the cushion, the resistance forces exerted thereon against torsional movements between inner and outer bearings of the cushion are reduced, the absorber cushion preferably has a fusiform to hexagonal base plane and in its most preferred embodiment the absorber cushion has a square base plane, if in the latter case there can be a four-fold nature of the possibly present axis of symmetry, then there can also be a two-fold axis in the same way, in that e.g. the base surface of the absorber cushion is given an e.g. diamond-shaped instead of a square construction. According to preferred developments the absorber cushion has a basically parallelepipedic outer contour or a pyramidal frustum-like outer contour. The faces of the absorber cushion need not form a plane and e.g. diagonally facing corners or angles of the faces can be in a plane with the circumferential surfaces, but are reciprocally displaced in the direction of the cushion axis.

As the casings received the absorber cushions are adapted to the illustrated basic shape of the particular cushion. In preferred manner a casing receiving the cushions is formed by an absorber outer holder connected to a pipe end and adapted to the cushion outer contour and a damper inner holder connected to the other pipe end and adapted to the cushion inner contour. According to other developments the outer and inner holders are shell-shaped. In addition, the lateral edges of the cushions are arranged parallel to the axis of symmetry of the pipe ends in the unloaded state, or the absorber cushions are aligned with diagonals parallel to the axis A of the pipe ends.

Apart from its force absorption and transfer function, the casing also protects the absorber cushions and in particular the bellows against chippings and sprayed water, as well as providing a sound emission protection, so that there is no need for any further shielding. They can also be constructed as an angular overload protection, with the maximum angular deflection preferably being limited to 5° to 10°.

Whereas, as a function of their construction, known decoupling means only gave an optimum damping or absorption in the case of a vertical or horizontal installation position, as a result of the inventive construction a decoupling device is provided which, independently of the installation position, ensures an optimum damping of all the movements which occur and ensures a uniform damping over all degrees of freedom. It is in particular possible to obtain a fixing against torsional forces acting on the absorber cushion envelope and a damping thereof, which leads to a damping of angular movements about the axis of symmetry of the cushions. Whereas preferably two damper cushions are provided diagonally to the major axis of the apparatus and therefore the pipe ends, they can also be displaced about the main pipe axis with respect to such a linear arrangement, so that they form an angle of less than 180°.

The preferred volumetric weight of the absorber cushion is between 1.4 and 1.8 kg/dm$^3$. The preferred cushion height is between 5 and 15 mm for a pipe diameter of 50 mm. In the case of other pipe diameters the cushion height is preferably in a corresponding ratio thereto. The preferred ration a/l between the cushion thickness a and height l is between 2:1 and 4:1.

Other advantages and features of the invention can be gathered from the claims and following description relative to non-limitative embodiments and the attached drawings, wherein show:

DETAILED DESCRIPTION

The inventive apparatus for decoupling two pipe parts, as shown in FIGS. 1, 1A, 1B and 2, has two pipe ends 2,3, on pipe sockets 4,6, which are flexibly interconnected by a bellows 7 surrounding the same. An absorber transfer body 8 is located concentrically on the pipe socket 4 and is fixed, such as by welding, thereto and in its fixing area 9 is constructed in ring or sleeve-like manner with the pipe socket 4 and from it extends a pyramidal inner holder 11 for an absorber cushion 12, which forms an inner or lower part of an enclosure for the cushion 12. The outer or upper part of the absorber cushion 12 is formed by a correspondingly shaped, pyramidal frustum-like outer holder 13, which is constructed on an outer absorber transfer body 14, which also has a sleeve or ring portion 16, with which it engages on the end 3 of the other pipe socket 6. Between the inner and outer holders 11,13 is located the pyramidal frustum envelope-like absorber cushion 12 and its outer and inner side walls 17,18 engage on the inner or outer holder 11,13, being retained at its upper and lower faces 21,22 by offsets or bends 23,24 of holders 11,13. In the illustrated embodiment, the absorber cushion 12 is positioned relative to the axis A of pipe sockets 4,6 (in the unloaded state), in such a way that the diagonal of its base surface and its axis of symmetry is at right angles to pipe axis 8. On the side facing ring area 9, the inner holder 11 with its support surface areas for the absorber cushion 12 is constructed in one piece with ring area 9 relative to the axis-normal median plane 4 of the system. The support parts of the inner holder located on the other side of the median axis M are constructed as a separate part and are connected by welding to the aforementioned part at 26. It can preferably be constructed in one piece with the pipe end 2, so that in economic manner the number of parts is further reduced. Pressure joints can be used in place of welded joints.

The same applies with regards to the outer holder 13. Here again the parts of the outer absorber transfer body 14 constructed between the ring area 16 and the axis-normal median plane M are constructed in one piece, while the support parts located on the other side of the median plane are welded at 27 in the vicinity of the latter.

Figure 1:
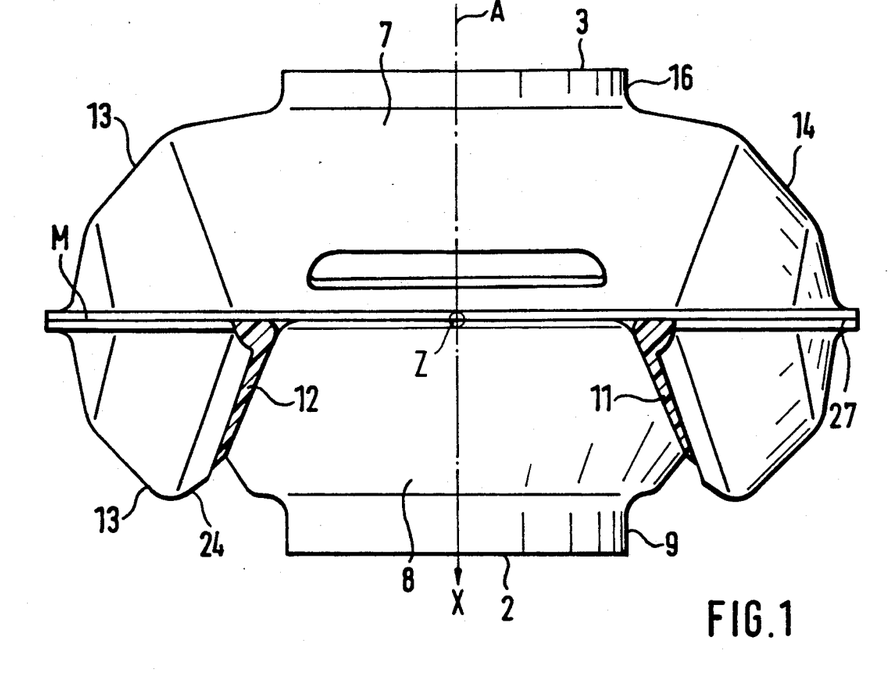
FIG. 1 is a detailed side view of a first embodiment of the inventive apparatus.
Figure 1A:
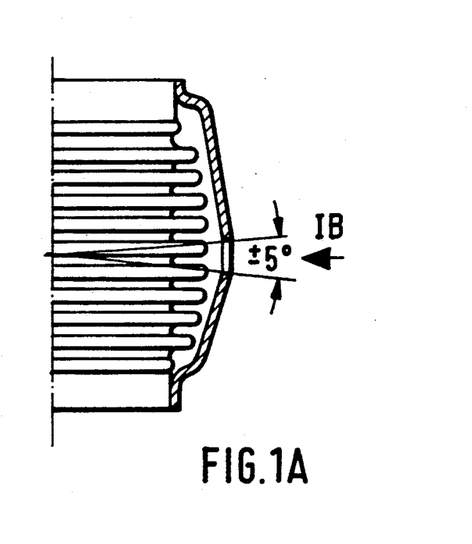
FIG. 1A is a section through a construction with a drum-shaped bellows.
Figure 1B:
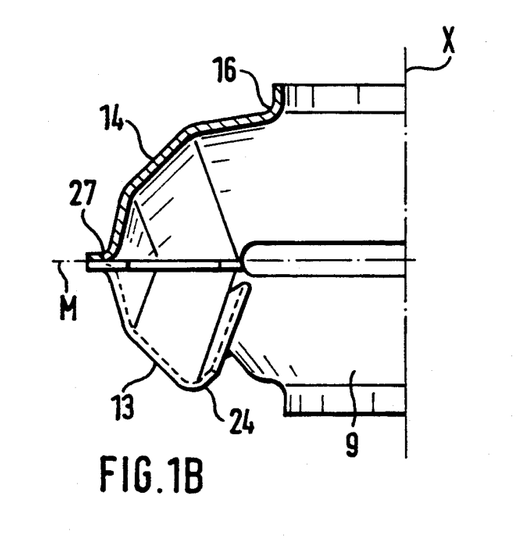
FIG. 1B is a view along arrow Ib in FIG. 1A.
Figure 2:
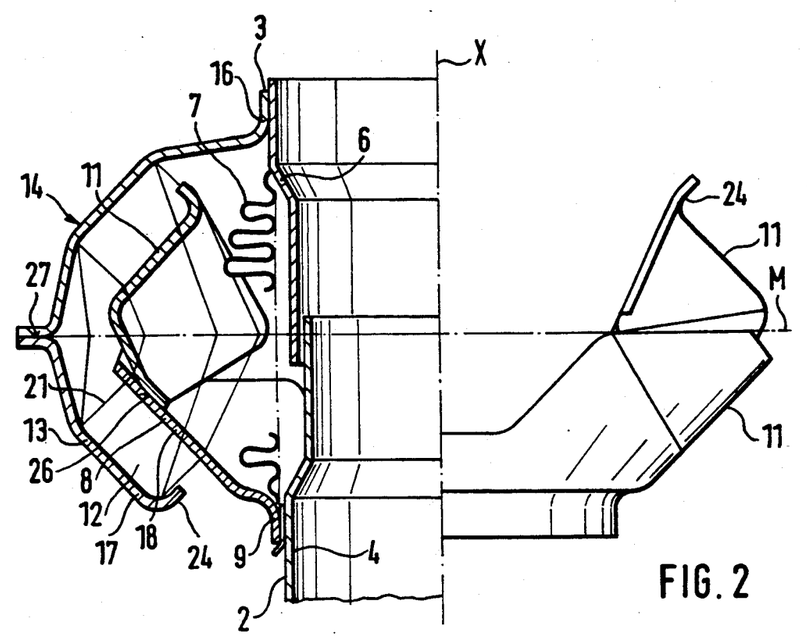
FIG. 2 is a diagrammatic view of an axial section of the apparatus of FIG. 1.
Figure 3:
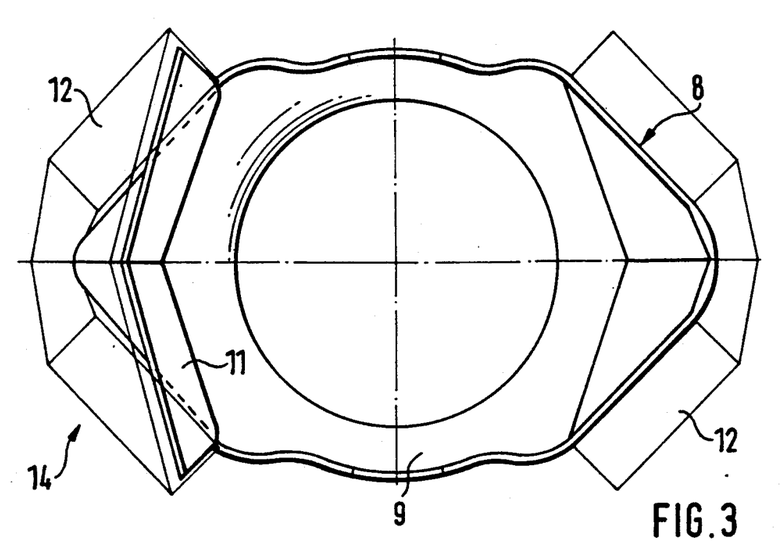
FIG. 3 is a diagrammatic view of a vertical section of the apparatus of FIG. 1.
Figure 4:
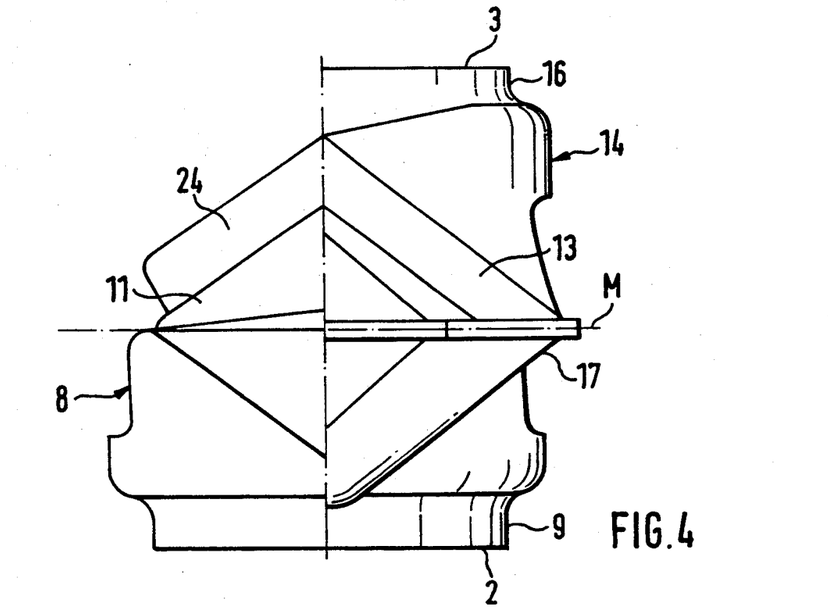
FIG. 4 is a diagrammatic plan view corresponding to arrow IV—IV in FIG. 1 (right-handside) and the absorber inner holder (left-handside) with the damper outer holder broken away.

As a result of the inventive construction an apparatus is obtained having a substantially identical vibration damping or absorption in all directions and with respect to all movements which occur, while having no preferred directions where no damping can take place, as is the case with the prior art. There is in particular an absorption of angular movements of the pipe sockets 4,6 about the axis-normal axis of symmetry of cushions 12 due to the polygonal or many-sided cushion construction. As can be seen in FIG. 1, the same applies with regards to axial, angular movements of the median axes of the two cushions and torsional movements of the pipe sockets 4,6 about axis of symmetry X.

Figure 5:
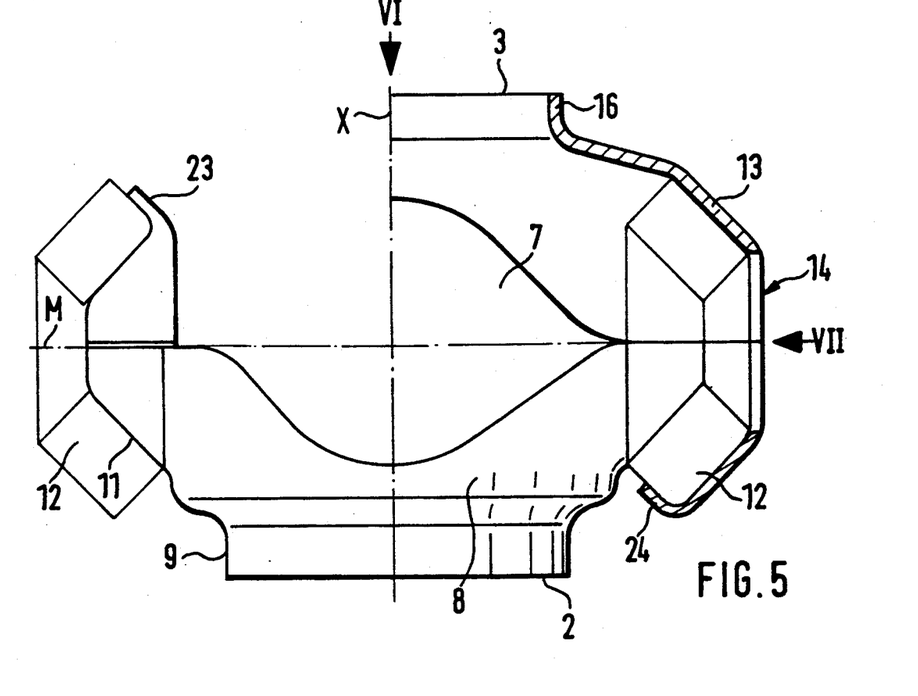
FIG. 5 is a diagrammatic view similar to FIG. 2 in another embodiment of the inventive apparatus.
Figure 6:
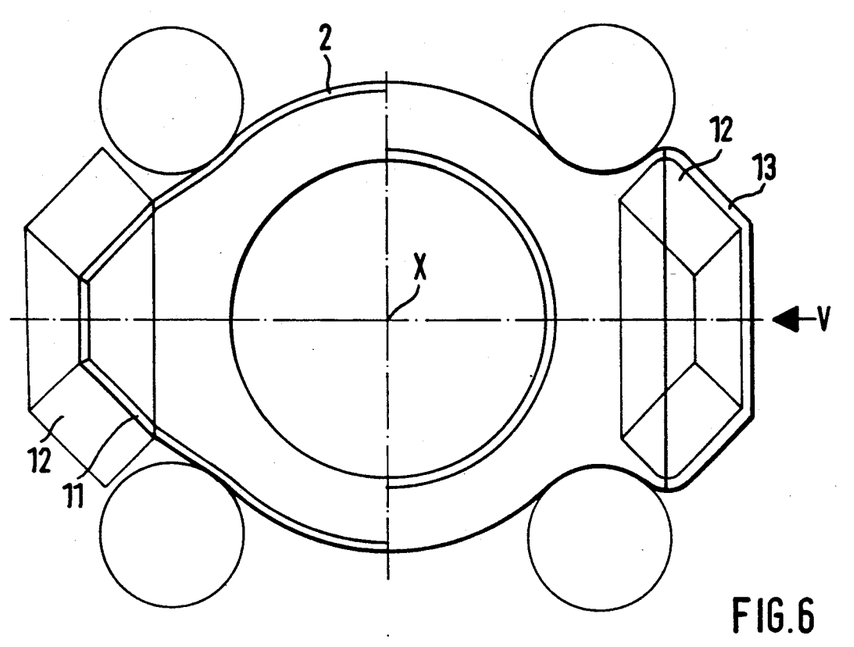
FIG. 6 is an axis-normal section similar to FIG. 3, but in the construction of FIG. 5.
Figure 7:
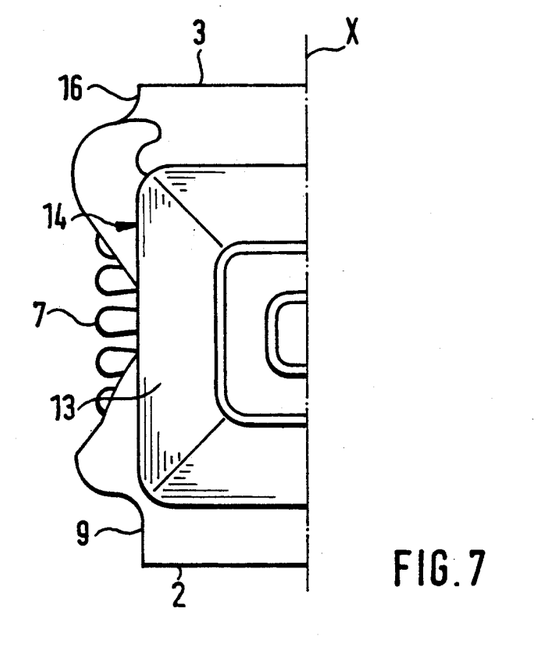
FIG. 7 is a plan view taken in the direction of the arrow VII in FIG. 5.
Figure 8:
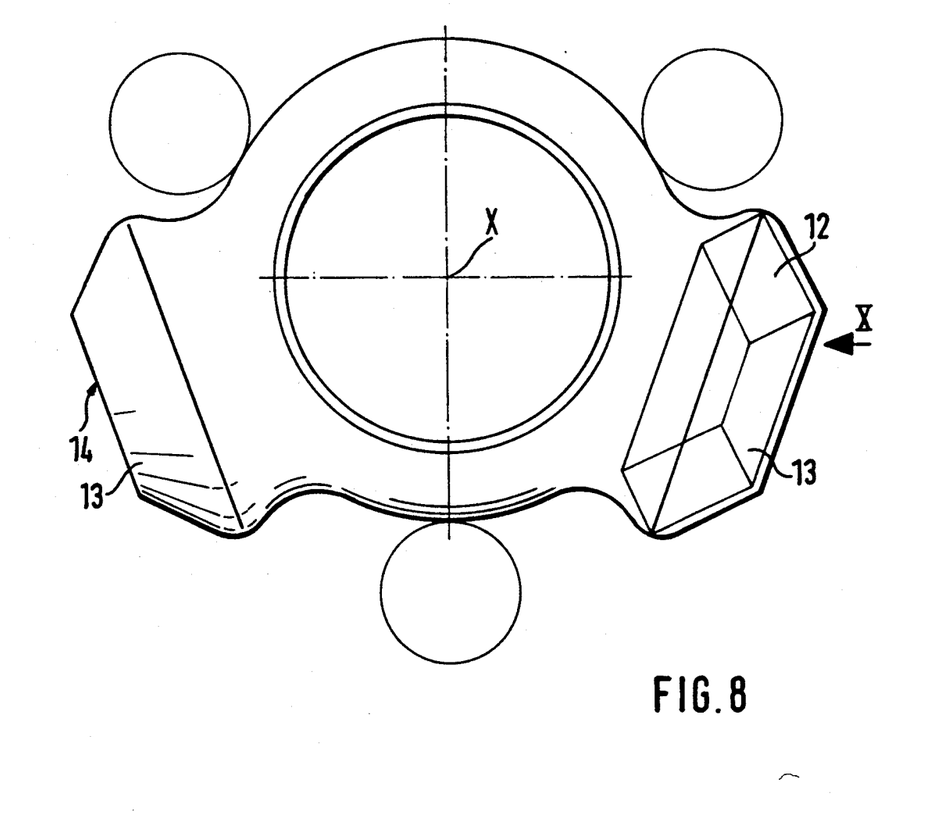
FIG. 8 is an axial view of a further construction of the inventive apparatus.
Figure 9:
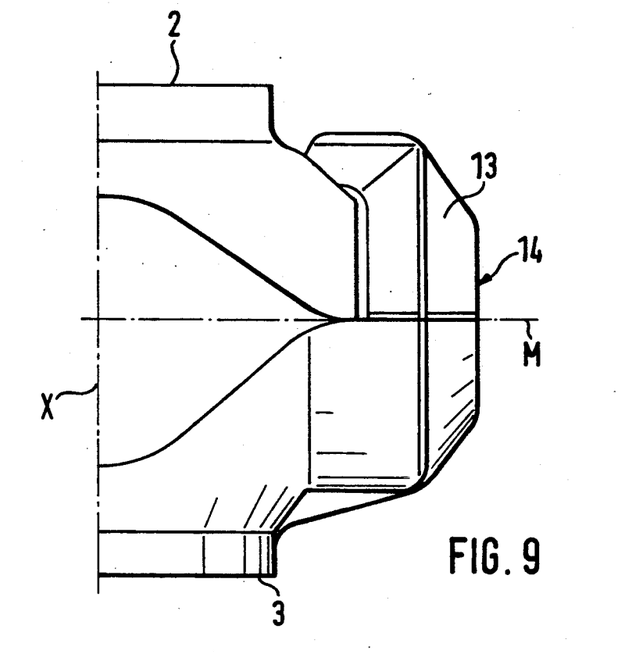
FIG. 9 is a plan view corresponding to that of FIG. 1 of half the construction of FIG. 8 (symmetrical with respect to the other half)
Figure 10:
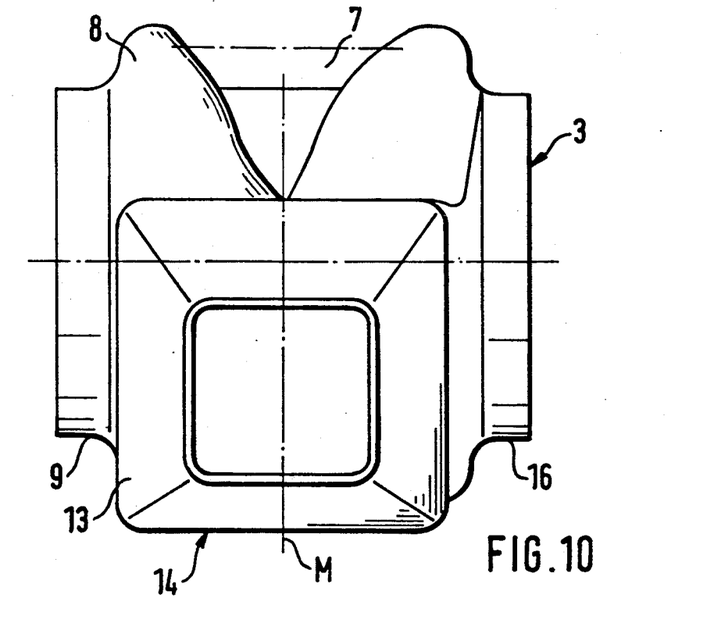
FIG. 10 is a view taken in the direction of the arrow X in FIG. 8.

FIGS. 5 to 7 also show an arrangement in which the absorber cushions 12 face one another diagonally to axis X, but the cushions 12 are not arranged diagonally and instead their side walls or edges are oriented parallel to perpendicular to the axis of symmetry X. In FIGS. 8 to 10 the absorber cushions 12 are oriented in the same way as in FIGS. 5 to 7, but no longer diagonally face one another and are instead displaced about the axis of symmetry X of the arrangement by a certain angle, so that in the represented embodiment they form, for example, a relative angle of 135° with respect to axis X.

Figures 11, 12, 13, 14, 15:
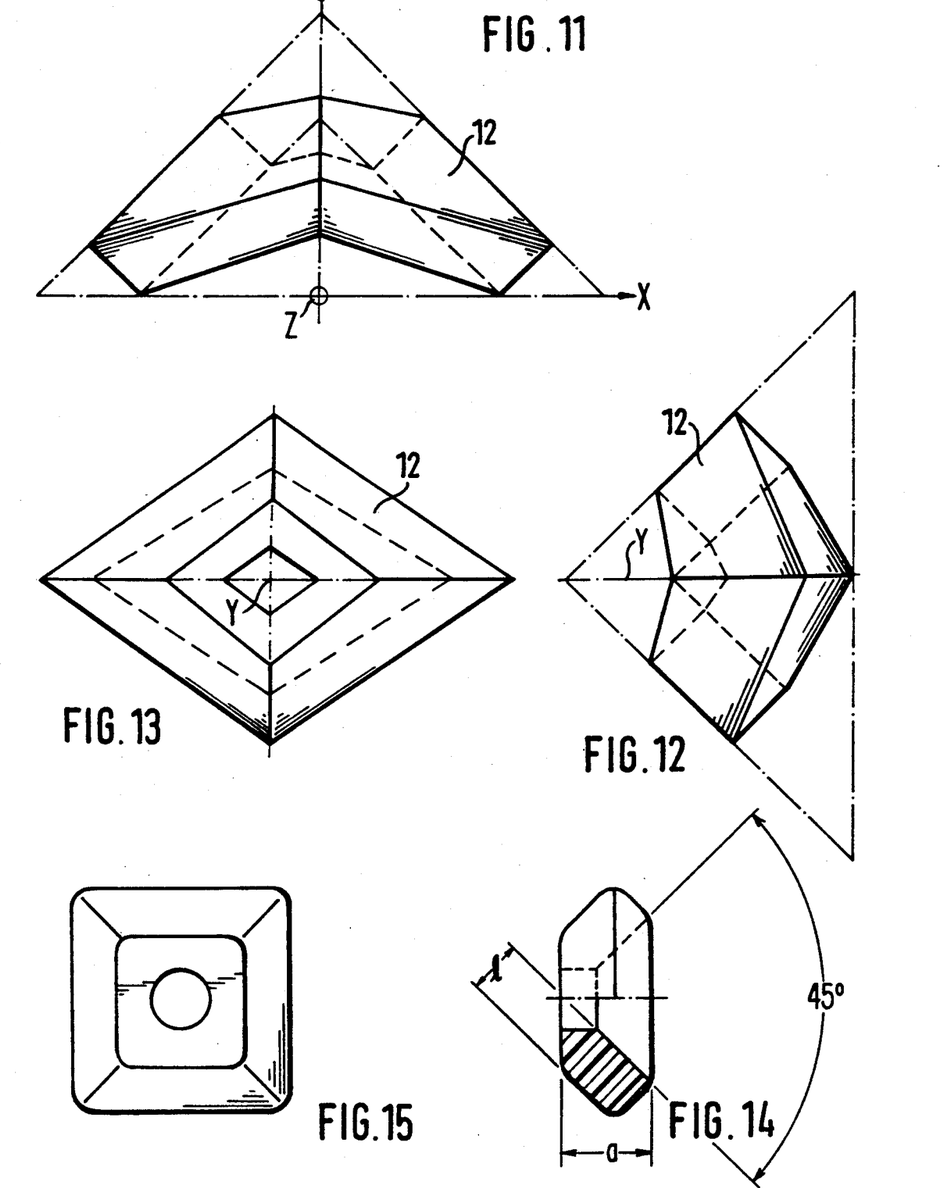
FIGS. 11–13 are two side views and a plane view respectively, of an absorber cushion constructed in accordance with the present invention.
FIGS. 14 and 15 are part sectional and plane view of an absorber cushion with square base surfaces.

FIGS. 11 to 13 show vertical side views or a plan view of a preferred embodiment of an absorber cushion 12, such as is, for example, used in the case of the construction of FIGS. 1 to 4. Auxiliary lines are shown in dot-dash line form, while concealed boundary lines of cushion 12 are interrupted. It is clear that the basic shape of the cushion is that of a pyramid or pyramid envelope, although having a diamond-shaped base and not a square base (FIG. 13). It can also be seen that the corners of the cushion 12 (in which in each case three edges converge) are not all located in one plane at right angles to the axis of symmetry Y of the cushion, but instead in each case diagonal angles are in one plane relative to axis Y and reciprocately displaced in the direction of the latter. This permits an adaptation to the cylinder envelope-like outer contour of apparatus 1 and particularly bellow 7, as can be seen in FIG. 1. The cushion can fundamentally have different shapes, but it is important that a random sectional surface has at least three, preferably up to six and max. Preferably in each case four corners and does not have a circular, annular or elliptical contour, as is the case with cylinders, cylinder envelopes, a cone or the like, which regularly cannot take up and therefore cannot damp circumferentially or tangentially acting forces.

Although the invention was described hereinbefore against the example of a pipe-pipe connection, it can also be used for a flange-pipe or a flange-flange connection.

We claim:

1. Apparatus for a vibration-based decoupling of two pipe parts, particularly a gas-type metal bellows decoupling between an exhaust pipe of an internal combustion engine and an exhaust system, the apparatus comprising at least two compressed absorber cushions made from braided, knitted, tangled or similar wire, each of said absorber cushions being annular and having an aperture disposed on a radially outwardly projecting holder and, when in use, extends along only a portion of the circumference of its respective annular transfer body, said cushions are radially spaced apart and diametrically opposed and wherein each of the absorber cushions is polygonal in configuration and includes at least three sharp converging edges between individual circumferential areas of the respective absorber cushions so as to prevent a free twisting of the respective cushions in the apparatus thereby enabling a damping in all movement directions.

2. Apparatus according to claim 1, wherein each absorber cushion has a fusiform to hexagonal base plane.

3. Apparatus according to one of claims 1 or 2, wherein each cushion has a pyramid frustrum-like outer contour.

4. Apparatus according to claim 3, wherein angles between a base surface and pyramid frustrum edges of each of the cushions are between 25° and 65°, preferable 45°.

5. Apparatus according to one of claims 1 or 2, wherein each of the cushions has a polygonal inner contour.

6. Apparatus according to one of claims 1 or 2, further comprising a casing for receiving the absorber cushions formed by an absorber outlet holder connected to one pipe end and adapted to an outer contour of the absorber cushions and an absorber inner holder connected to the other pipe end and adapted to an inner contour of the absorber cushions.

7. Apparatus according to claim 6, wherein the outer and inner holders each have a shell-like construction.

8. Apparatus according to one of claims 1 or 2, wherein each absorber cushion is under pretension in the casing.

9. Apparatus according to one of claims 1 or 2, wherein the absorber cushions are arranged in an unloaded state with outer lateral edges thereof disposed in parallel to an axis of symmetry of ends of the respective pipe parts.

10. Apparatus according to one of claims 1 or 2, wherein the absorber cushions are arranged with diagonals of outer lateral edges thereof disposed in parallel to a longitudinal center axis ends of the respective pipe parts.

11. Apparatus according to one of claims 1 or 2, wherein an inner contour of each of the cushions is not parallel to an outer contour thereof.

12. Apparatus according to claim 11, wherein at least one of the outer and inner contour is rectangular and the other of the inner and outer contour is prismatic.

13. Apparatus according to one of claims 1 or 2, wherein an inner contour of each of the cushions is parallel to an outer contour thereof.

14. Apparatus according to one of claims 1 or 2, wherein effective surfaces of each of the cushions in an X, Y, and Z direction are equal.

15. Apparatus according to one of claims 1 or 2, wherein projections of effective surfaces of each of the cushions in an X, Y and Z direction are equal.

16. Apparatus according to one of claims 1 or 2, wherein an outer contour of the gas-like metal bellows is drum-shaped.

17. Apparatus according to claim 2, wherein each absorber cushion has a square based plane.

18. Apparatus according to claim 17, wherein each absorber cushion has a substantially parallelepipedic outer contour.

* * * * *